No. 844,728. PATENTED FEB. 19, 1907.
J. P. JOHNSTON.
RUBBER TIRED WHEEL.
APPLICATION FILED MAR. 28, 1906.
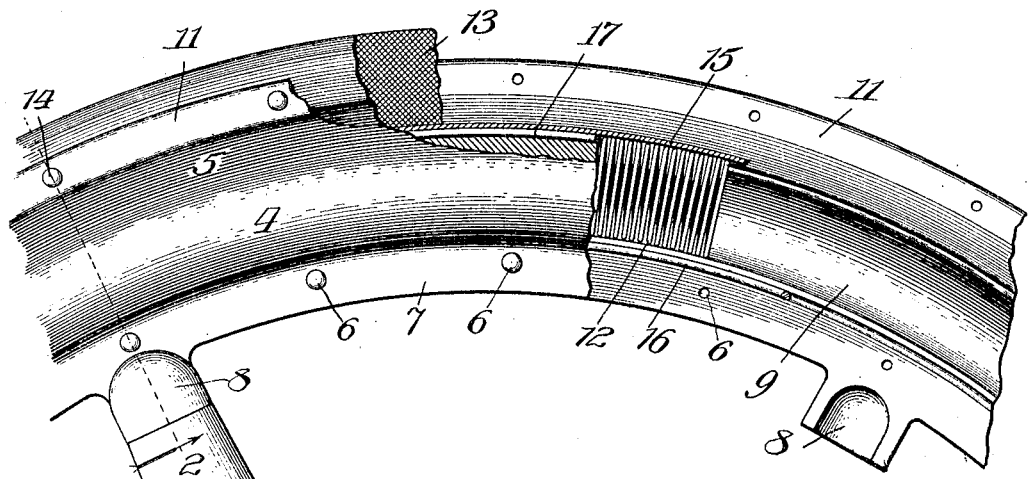
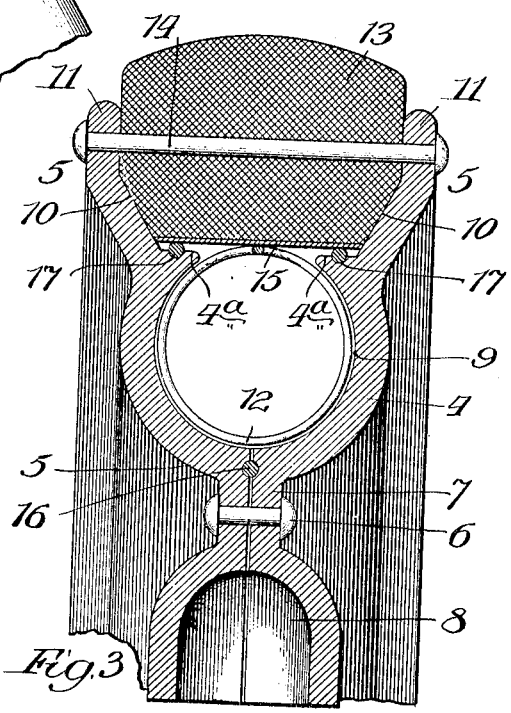
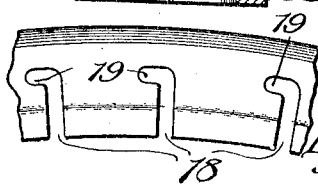
Witnesses:
Inventor:
John P. Johnston

UNITED STATES PATENT OFFICE.

JOHN P. JOHNSTON, OF EVANSTON, ILLINOIS.

RUBBER-TIRED WHEEL.

No. 844,728.          Specification of Letters Patent.          Patented Feb. 19, 1907.

Application filed March 28, 1906. Serial No. 308,437.

*To all whom it may concern:*

Be it known that I, JOHN P. JOHNSTON, a citizen of the United States, residing at Evanston, in the county of Cook and State of Illinois, have invented a new and useful Improvement in Rubber-Tired Wheels, of which the following is a specification.

My object is to provide a durable solid-rubber-tired wheel, more especially for automobiles, which shall possess the resilient qualities of pneumatic tires without being subject to injury by puncturing; and to this end my invention consists in the general and also in the more specific construction of my improved device represented in the accompanying drawings, in which—

Figure 1 is a view in elevation, partly sectional, of a portion of a wheel equipped with my improvements, parts of the rim being broken away to disclose hidden details; Fig. 2, an enlarged section taken at the line 2 on Fig. 1 and viewed in the direction of the arrow, and Fig. 3 a broken view in elevation of a modification of the solid tire shown in Figs. 1 and 2.

4 is the wheel-rim, formed of two similar annular sections 5 5, secured together, as by bolts 6 6 passing through the abutting neck portions 7 7 of the rim-sections, and which may be riveted, as shown, the rim being provided at intervals with inwardly-extending radial spoke-sockets 8 8, formed by inward projections on the rim-sections. The sections of the rim are shaped to form an annular cylindrical chamber 9 beyond the neck 7, opening into a tire-seat 10, formed by flanges 11 11, flaring outwardly from their junction with the chamber-walls at shoulders 4ᵃ to their straight edge portions. 12 is an annular preferably coiled spring housed within the chamber 9. 13 is a solid tire, of rubber or suitable analogous material, confined on the seat 10 between the flanges 11 and secured in place thereon, as by bolts 14 or rods extending at intervals transversely through it and the flanges, and which may be riveted, as shown. 15 is a ring of thin metal, preferably spring-steel, interposed between the spring 12 and the inner surface of the tire for protecting the latter against injury from rubbing contact with the spring. 16 is an annular gasket, of lead or other suitable material, which may be provided between the meeting faces of the neck portions 7, and 17 17 are similar gaskets interposed between the shoulders 4ᵃ and the inner surface of the ring 15, these gaskets serving to close the chamber 9 against the egress of dry lubricant, such as graphite or other suitable lubricant, which may be supplied in the chamber to reduce to the minimum the wear by the spring 12 upon the surface of the ring 15.

The modified construction of the tire illustrated in Fig. 3 provides a series of recesses 18 18, extending from its inner surface into elongated bolt-holes 19 19, arranged to register with the bolts 14. This provision enables the tire in non-endless form to be readily applied to the rim by fitting the recesses over the bolts 14 and causing the latter to enter the bolt-holes 19, whereupon the free ends of the tire may be secured together in any suitable manner.

The coiled spring and interposed metal strip 15 being resilient are flexed by the pressure of the tire against the strip, thus augmenting the cushioning effect of the tire and rendering it highly resilient.

What I claim as new, and desire to secure by Letters Patent, is—

1. In a solid-rubber-tired wheel, the combination of a wheel-rim composed of annular sections secured together and forming an annular chamber, and a tire-seat about and opening into said chamber, a spring in said chamber, a tire confined on said seat and a metal strip interposed between said tire and spring, for the purpose set forth.

2. In a solid-rubber-tired wheel, the combination of a wheel-rim composed of annular sections provided with neck portions at which they are secured together, and forming an annular chamber, and provided with flanges forming a tire-seat about and opening into said chamber, a tire confined on said seat, a spring in said chamber and a metal strip interposed between the tire and spring, for the purpose set forth.

3. In a solid-rubber-tired wheel, the combination of a wheel-rim composed of annular sections provided with neck portions at which they are secured together, and forming an annular chamber, a tire-seat about and opening into said chamber and having shoulders about its base portion, a spring in said chamber, a tire confined on said seat, a metal strip interposed between said spring and tire, and gaskets interposed between the meeting surfaces of the neck portions and between said shoulders and said metal strip, for the purpose set forth.

4. In a solid-rubber-tired wheel, the combination of a wheel-rim composed of annular sections, provided with neck portions at which they are secured together, and with inward projections forming spoke-sockets, said sections forming an annular chamber and a tire-seat about and opening into said chamber, a spring in said chamber, a tire confined on said seat, and a metal strip interposed between said spring and tire, for the purpose set forth.

JOHN P. JOHNSTON.

In presence of—
W. B. DAVIES,
J. H. LANDES.